UNITED STATES PATENT OFFICE.

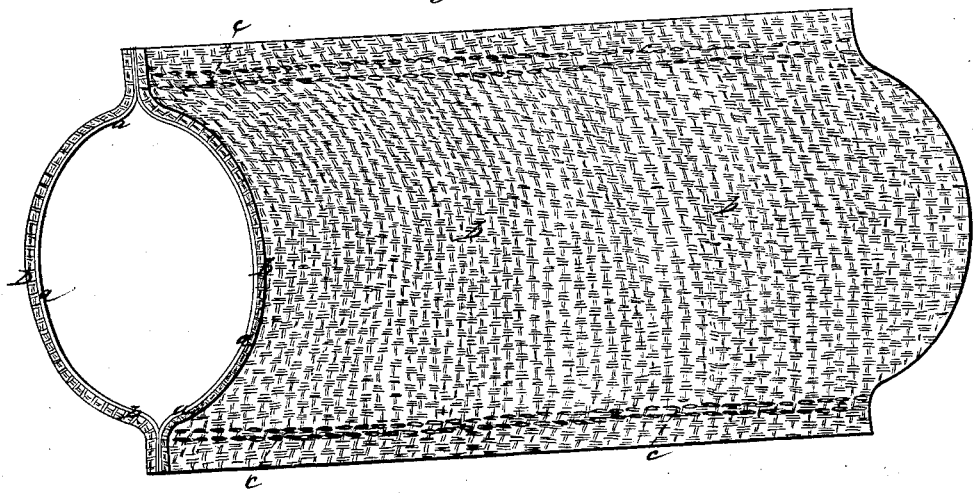
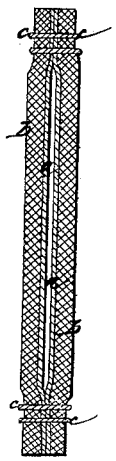

THOMAS J. MAYALL, OF ROXBURY, MASSACHUSETTS.

WATERPROOF HOSE.

Specification forming part of Letters Patent No. 31,614, dated March 5, 1861; application for Reissue filed July 15, 1873.

*To all whom it may concern:*

Be it known that I, THOMAS J. MAYALL, of Roxbury, in the county of Norfolk and State of Massachusetts, have invented certain new and useful Improvements in Hose or Tubing for Conveying Liquids; and that the following description, taken in connection with the accompanying drawings, hereinafter referred to, forms a full and exact specification of the same, wherein I have set forth the nature and principles of my said improvements, by which my invention may be distinguished from all others of a similar class, together with such parts as I claim and desire to have secured to me by Letters Patent.

Many kinds of india rubber and gutta-percha hose have recently been invented as substitutes for the ordinary leather hose, being cheaper and more durable. The india rubber or gutta-percha hose is most commonly formed by winding strips of cloth coated with rubber or gutta-percha, upon a mandrel and then vulcanizing, the thickness of the hose depending upon the number of layers, and in very strong hose intended to resist great pressures the number of layers is necessarily very great. Another kind of hose consists of one or more woven tubes lined with rubber or gutta-percha and the woven tubes either woven in a circular form without a seam or else united after being coated with the water-proof lining, by rivets around a circular mandrel.

In all the various kinds of rubber or gutta-percha hose whether made as above described or otherwise sufficient strength to resist great pressures can only be obtained by making the hose of a great number of layers or of very thick woven fabrics in consequence of which it becomes so stiff and inflexible that it retains its circular form and therefore can not readily be wound compactly upon a reel or roller in readiness for use, its great bulk, in very strong hose, rendering it nearly impossible to reel it. In these kinds of hose also when subjected to great pressures, the "filling" of the cloth composing the outer layers of the hose being on a larger circle stretches and pulls apart much more than the inner and smaller circles and therefore soon becomes weak in the locality where the most strength is required, viz; on the outer circumference of the hose.

My improvements consist in forming a hose of two flat pieces or sides of cloth, (covered with rubber or gutta-percha) in one or more layers, the flat pieces or sides being united at their edges by sewing, riveting or in any other proper manner. By this mode of manufacturing the hose, great thickness and strength can be imparted to it, while its form except when distended by internal pressure will always be flat, the two sides lying compactly together, the convenience of which for reeling or transportation will be manifest.

A convenient form of my improved hose, is represented in the accompanying drawings of which—

Figure 1 is a perspective view representing my new hose as distended and Fig. 2 a transverse vertical section of the same when not exposed to internal pressure.

One mode of manufacturing my improved hose I will now proceed to describe in detail. I take a sheet or narrow strip $a\ a$ of rubber or gutta-percha of any desired thickness either in a sticky condition on one surface or coated with a suitable cement and pass it through rollers in company with a sheet of duck $b\ b$ so as to unite the two by pressure. Two of the pieces thus prepared are then united by stitching as shown at $c$ Fig. 1 or by riveting or otherwise, with the rubber or gutta-percha coating inside. The inner woven fabric instead of being lined with a sheet of rubber or gutta-percha may be coated sufficiently with a cement of rubber or gutta-percha as to form a water-proof lining.

Another simple mode of producing my new hose is to take narrow sheets or strips of cloth, coat them on one or both sides with india-rubber or gutta-percha and then unite them as before explained, not around a mandrel but by sewing or riveting, any number, desired, of layers being used to constitute the sides of the hose.

In both the above described modes of operation the hose can be vulcanized or not as may be desired.

Having thus described my improvements, what I claim as my invention and desire to have secured to me by Letters Patent is—

Forming a hose or tubing in two flat pieces or sides of cloth or woven fabric coated with rubber or gutta-percha in one or more layers or thicknesses and united at their edges by sewing, riveting or otherwise substantially as herein above set forth.

THOS. J. MAYALL.

Witnesses:
 JOSEPH GAVETT,
 ALBERT W. BROWN.